(12) United States Patent
Teague

(10) Patent No.: US 12,372,682 B2
(45) Date of Patent: Jul. 29, 2025

(54) NEAR-FIELD SENSITIVITY OF FORMATION AND CEMENT POROSITY MEASUREMENTS WITH RADIAL RESOLUTION IN A BOREHOLE

(71) Applicant: Visuray Intech Ltd (BVI), Tortola (VG)

(72) Inventor: Philip Teague, Houston, TX (US)

(73) Assignee: Visuray Intech Ltd (BVI), Road Town (VG)

( * ) Notice: Subject to any disclaimer, the term of this patent is extended or adjusted under 35 U.S.C. 154(b) by 0 days.

(21) Appl. No.: 18/225,235

(22) Filed: Jul. 24, 2023

(65) Prior Publication Data

US 2023/0375742 A1  Nov. 23, 2023

Related U.S. Application Data

(63) Continuation of application No. 17/150,894, filed on Jan. 15, 2021, which is a continuation of application No. 15/958,536, filed on Apr. 20, 2018, now abandoned.

(60) Provisional application No. 62/487,530, filed on Apr. 20, 2017.

(51) Int. Cl.
*G01V 5/10* (2006.01)
*H05H 3/06* (2006.01)
*H05H 5/02* (2006.01)
*H05H 6/00* (2006.01)

(52) U.S. Cl.
CPC ............... *G01V 5/102* (2013.01); *G01V 5/10* (2013.01); *G01V 5/108* (2013.01); *H05H 3/06* (2013.01); *H05H 5/02* (2013.01); *H05H 6/00* (2013.01)

(58) Field of Classification Search
CPC .......... G01V 5/102; G01V 5/10; G01V 5/108; H05H 3/06; H05H 5/02; H05H 6/00
See application file for complete search history.

(56) References Cited

U.S. PATENT DOCUMENTS

| | | | |
|---|---|---|---|
| 8,481,919 B2* | 7/2013 | Teague | H01J 35/02 |
| | | | 250/253 |
| 9,472,370 B2* | 10/2016 | Perkins | H01J 27/024 |
| 9,575,206 B2* | 2/2017 | Guo | C04B 28/02 |
| 2009/0045329 A1* | 2/2009 | Stoller | G01V 5/10 |
| | | | 250/269.4 |

(Continued)

*Primary Examiner* — David P Porta
*Assistant Examiner* — Fani Polyzos Boosalis
(74) *Attorney, Agent, or Firm* — Adams & Reese LLP; John Henry Scott, III

(57) ABSTRACT

A neutron porosity tool having an electronic neutron generator arrangement and a control mechanism used to provide voltage and pulses to an electronic neutron tube is provided, the neutron generator arrangement including: at least one vacuum tube; at least one ion target; at least one radio-frequency cavity; at least one high-voltage generator; at least two neutron detectors; at least one pulser circuit; and at least one control circuit. A method of controlling a neutron porosity tool having an electronic neutron generator arrangement and a control mechanism that provides voltage, and pulses to an electronic neutron tube, the method including at least: controlling a bipolar neutron tube to produce two distinct neutron reactions; using a control circuit to modify the output of a pulser circuit; and using a plurality of neutron detectors to determine formation response offsets.

15 Claims, 3 Drawing Sheets

(56) References Cited

U.S. PATENT DOCUMENTS

2010/0314536 A1* 12/2010 Molz .................. G01V 5/08
250/254
2012/0273342 A1* 11/2012 Schenkel ............ H01J 27/26
422/186.21

* cited by examiner

ND SENSITIVITY OF FORMATION
NEAR-FIELD SENSITIVITY OF FORMATION AND CEMENT POROSITY MEASUREMENTS WITH RADIAL RESOLUTION IN A BOREHOLE

CROSS-REFERENCES TO RELATED APPLICATIONS

This patent application claims benefit of U.S. patent application Ser. No. 17/150,984, filed Jan. 15, 2021, which claims benefit of U.S. patent application Ser. No. 15/958,536, filed Apr. 20, 2018, which claims the benefit of U.S. Provisional Patent Application No. 62/487,530, filed Apr. 20, 2017, the contents of which are hereby incorporated by reference in their entirety.

TECHNICAL FIELD

The present invention relates generally to near-field sensitivity of formation and cement porosity measurements with radial resolution in a borehole, and in a particular though non-limiting embodiment to methods and means of substantially increasing the output, of a deuterium-tritium pulsed neutron generator for use in neutron porosity borehole logging without dramatically increasing the length or diameter of the tool, or thereby increasing power consumption to unsustainable levels or reducing the lifetime of the generator tube.

BACKGROUND

Since F. M. Penning disclosed a neutron generator in U.S. Pat. No. 2,211,668 consisting of a low-pressure deuterium-filled envelope containing a cathode and an anode disposed in electromagnetic communication with an axially oriented magnetic field ion source, a nuclear reaction producing target, and one or more acceleration electrodes, various other references have been published disclosing additional control mechanisms and improvements. However, the majority of known art relies upon the use of the "Penning" ion source and has been employed extensively in various neutron generator tubes for downhole oil and gas well neutron logging.

The ion source type most widely used is the Penning type which has the advantage that it is robust, has a cold cathode and a long operating life as a consequence, yields considerable discharge currents at low pressures, in the order of 10 A/torr, has a high extraction efficiency of 20 to 40% and has small physical dimensions. This type of source requires a magnetic field on the order of a thousand-gauss parallel to the axis of the ionization chamber, which introduces a considerable transverse inhomogeneity of the ion flow density in the interior of the discharge and at the level of extraction occurring along the common axis of the field and of the source.

Neutron generator tubes are generally constructed as sealed tubes containing a gas mixture of deuterium and tritium under low pressure, from which the ion source forms a confined ionized gas. The emission (or extraction) port is provided in the cathode, while the acceleration (and extraction) electrode renders it possible to project the ion beam axially onto a target electrode.

The fusion deuterium-tritium reaction, $^3H+^2H \rightarrow ^4He+n$, which supplies neutrons of 14 MeV is most widely used because of its great effective sectional surface at comparatively low ion energy levels. Whatever reaction is used, however, the number of neutrons obtained per unit charge going through the beam always increases proportionally as the energy of the ions directed towards a dense target itself increases, to well beyond the ion energies obtained in presently available sealed tubes which are fed by a high voltage potential which seldom exceeds 250 kV. In almost all borehole neutron porosity logging operations, the reaction is limited to a maximum of 90 kV due to the issues with creating and controlling larger potentials within the confines of a small 3⅜" or 1¹¹⁄₁₆" diameter pressure housings as typically required. Deuterium-deuterium reactions, which supply neutrons of 2 MeV would be of use for near-field measurements, where the depth of investigation is required to be significantly smaller, such as the neutron-porosity measurement of cement structures surrounding a borehole, for the benefit of well integrity evaluation during drilling and plug and abandonment operations. However, deuterium-deuterium reactions typically rely upon a tube potential in excess of 160 kV, which is an issue with the aforementioned geometrical constraints of the tool housing, when considering electrical dielectric breakdown strengths of suitable insulators.

Erosion of the target by the ion bombardment is one of the most determining factors among the principal constraints governing the operating life of a neutron generator tube. The erosion is a function of the chemical composition and the structure of the target on the one hand, and of the energy of the incident ions and their density distribution profile on the impact surface on the other hand. In most cases the target is formed from a material capable of forming a hydride (titanium, scandium, zirconium, erbium, etc.) and of binding and releasing considerable quantities of hydrogen without an inadmissible disturbance of its mechanical strength, and the total quantity bound is a function of the temperature of the target and of the hydrogen pressure in the tube. The target materials used are deposited in the form of thin layers whose thickness is limited by adhesion problems of the layer on its support. A means of slowing down the erosion of the target consists, for example, in forming the active absorbing layer from a superimposition of identical layers insulated from one another by diffusion barriers. The thickness of each of the active layers is of the order of the penetration depth of the deuterium ions which are to strike the target. One method of protecting the target, and thus of increasing the operating life of the tube, is to influence the ion beam in such a way as to improve its density distribution profile on the impact surface. At an overall ion flow on the target which is constant, which leads to a constant neutron emission, this improvement results in a flow density distribution over the entire surface of the target exposed to the ion bombardment which is as uniform as possible. However, the problem that continues to limit the contemporary neutron generator tube is the removal of thermal energy from the target surface of the tube. It is known that the energy of the ion beam striking the target and inducing the desired nuclear reaction will, if too intense, result in high temperature sputtering and thermal failure of the target and thus failure of the neutron generator tube. As a result, most contemporary neutron generator tubes are limited to a tube potential of 80-100 keV and 30-50 uA beam current. The resultant number of output neutrons (14 MeV) is in the region of $5 \times 10^7$ to $1 \times 10^8$ neutrons per second.

A typical neutron porosity measurement will operate in the range of 0 to 60 porosity units (p.u.), where 100% p.u. would be regarded as a simple infinite volume of water surrounding the tool. Typical accuracies required for the measurement would be +/−0.5% for measurements less than 10 p.u., +/−7% for measurements in the 10 p.u. to 30 p.u.

range, and +/−10% in the 30 to 60 p.u. measurement range. As a result of the statistical requirements to match or improve upon these accuracies is highly dependent upon the detected signal, which, again is highly dependent upon the output neutron rate of the generator, most logging speeds are limited to 1800 feet per hour. Logging speeds of 3600 feet per hour are achievable, but at the deficit of accuracy of the measurement.

None of the prior art teaches of practical methods or means that can be employed to double the effective output of the tube without increasing the high voltage potential without reducing the lifetime of the tube, nor teaches of a method or means to measure near-field and far-field physics, such that distinct radial components to the measurement's resolution can be determined (i.e., radial resolution of more than "1"). Further, none of the known art teaches a method or means to selectively switch between various fusion physics types during operation. Moreover, none of the known art teaches a method or means to alternate between various fusion physics types during operation.

U.S. Pat. No. 2,211,668 to Penning discloses an electric discharge tube having a plurality of interconnected portions in which the pressure is the same. The ions are produced in a glow discharge taking place in one portion and are accelerated in another portion, and finally strike a disc of impact, which contains a definitive compound to produce the nucleus reaction.

U.S. Pat. No. 3,546,512 to Frentrop discloses a permanent magnet that is outgassed for use in a controlled atmosphere by heating a ferromagnetic material to a temperature at which an irreversible loss of remanence takes place, but below the temperature at which material effects substantially reduce or remove all remanence without further special heat treatment. Gases emitted from the heated surfaces of the magnet then are evacuated. Permanent magnetic properties are not destroyed by this heat treatment, and a magnetic field of substantial strength subsequently is produced by magnetizing the outgassed material. A specific embodiment of the disclosure enables a hollow cylindrical ion source magnet to be placed within the envelope of a small neutron generator to provide both a magnetic field and an ion source electrode. The assembled generator then is outgassed and sealed. Subsequent magnetization enables the electrode to produce the high intensity magnetic field needed for ion generation.

U.S. Pat. No. 4,996,017 to Etheridge discloses a neutron generating system comprising a hermetically sealed housing containing an ionizable gas and a ring anode and target cathode of a Penning ion source. The housing is provided with a recess axially oriented relative to the ring anode and target cathode and adapted to accept a removable samarium/ cobalt magnet such that degassing and sealing of the housing can be performed in the absence of the permanent magnet.

U.S. Pat. No. 5,215,703 to Bernardet discloses a neutron generator tube including an ion source having at least one anode, at least one cathode having at least one extraction port, and an accelerator electrode arranged so as to project at least one ion beam from the ion source onto a target to produce thereat a reaction resulting in emission of neutrons. The ion source is arranged on at least a portion of a first surface of revolution and is constructed so as to produce emission of ions radially outwardly from such surface. The accelerator electrode is arranged on at least a portion of a second surface of revolution the surrounds the aforesaid first surface, the target being positioned on at least a portion of a third surface of revolution which surrounds the aforesaid second surface. Increased neutron flux is thereby achieved for a given size generator tube, and for a given neutron flux a significantly reduced ion bombardment density is produced at the target and so achieves extended target life.

U.S. Pat. No. 8,481,919 to Teague teaches a method and means of creating and controlling the electrical power necessary by serially stepping up the DC reference and creating high potential field control surfaces in order to control either a bipolar or unipolar x-ray tube for the purposes of replacing chemical sources in reservoir logging. Teague also teaches of moveable/manipulatable beam hardening filters and rotating light-house collimation on the source, and the use of gaseous insulators including SF6 as an electrical insulator in a downhole x-ray generator.

U.S. Pat. No. 9,575,206 to Guo et al. discloses a neutron activation measurement technique that can be used to evaluate various properties of a subterranean well structure. In an example implementation, a logging tool can be positioned within a wellbore, such that neutrons generated by a neutron source are directed towards well structure. In response to the neutrons, the well structure emits gamma rays. A portion of the gamma rays can be detected by a gamma detector. To enhance the well structure's response to neutron activation, the well structure can be constructed of materials that include one or more doping materials.

Finally, U.S. Pat. No. 9,472,370 to Perkins discloses a neutron radiation generator that includes at least three extractor electrodes, with an ion source upstream of the at least three extractor electrodes to emit ions in a downstream direction toward the at least three extractor electrodes. There is a target downstream of the at least three extractor electrodes. The at least three extractor electrodes have independently selectable potentials so as to allow direction of an ion beam, formed from the ions, by the independently selectable potentials, toward different longitudinal and lateral regions of the target.

SUMMARY

A neutron porosity tool having an electronic neutron generator arrangement and a control mechanism used to provide voltage and pulses to an electronic neutron tube so that the output of two neutron reaction planes from collocated target planes in a wellbore environment is provided, the neutron generator arrangement including: at least one vacuum tube; at least one ion target; at least one radio-frequency cavity; at least one high-voltage generator; at least two neutron detectors; at least one pulser circuit; and at least one control circuit.

A method of controlling a neutron porosity tool having an electronic neutron generator arrangement and a control mechanism that provides voltage and pulses to an electronic neutron tube thereby enabling the production of two distinct neutron energies to provide radial discrimination of porosity is also provided, the method including at least: controlling a bipolar neutron tube to produce two distinct neutron reactions; using a control circuit to modify the output of a puller circuit; and using a plurality of neutron detectors to determine formation response offsets.

BRIEF DESCRIPTION OF SEVERAL EXAMPLE EMBODIMENTS

The methods and means described herein enable pulsed neutron generators to substantially increase their output and rapidly switch between output neutron energies while maintaining a single reactance plane, within the environment of a borehole. Control mechanisms for various neutron tube geometries and high-voltage generators that power said neutron tubes are provided, the tool including at least a pulsed neutron tube, a radio-frequency cavity, a high-voltage generator, and an electronic pulsing scheme to selectively switch said radio-frequency cavity.

Figure 1:
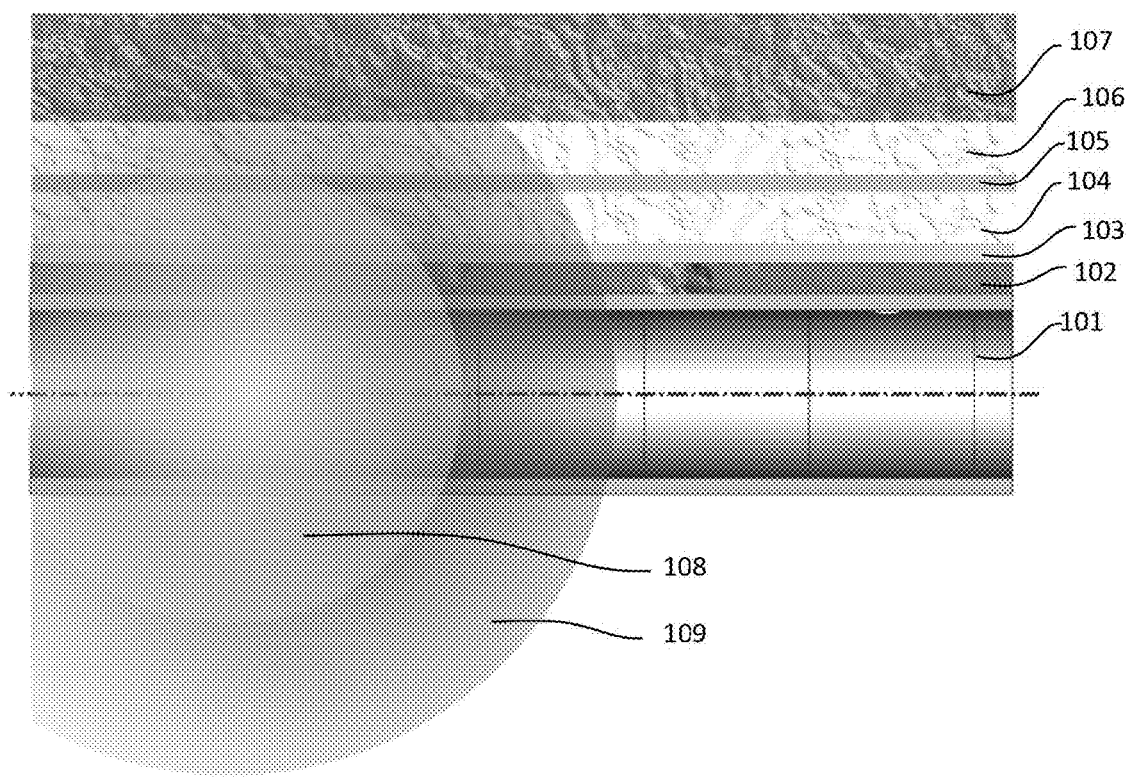
FIG. 1 illustrates a downhole tool housing located within a cased borehole, where the casings are cemented to each other and to the formation; in this example, two spheres illustrate the difference in depth of investigation of high and low neutron energies.

With reference now to the attached Figures, FIG. 1 illustrates an electronic neutron source located within a downhole tool pressure housing [101], which is located within a well casing [103] filled with well or drilling fluid [102]. The first well casing [103] is cemented [104] to a further casing [105] that is again cemented [106] to the well formation [107]. The energy of produced neutrons [108, 109] determines the depth of investigation of the measurement and, therefore, the offset of the detectors of optimum sensitivity. In this example, the lower energy neutrons produced through a deuterium-deuterium (DD) reaction would produce a measurement that is more sensitive to porosity changes within a near-field region [108], such as the cement immediately surrounding a borehole [104]. Whereas higher energy neutrons produced by a deuterium-tritium (DT) reaction would be sensitive to a near-and-outer-field zone [109], such as the formation [107] and outer cemented casing annuli [106] of a well. The bias between the DD measurement and the DT measurement can be used to indicate whether increased porosity (as could be expected by a fluid channel in the cement) is in the near-field zone [108] or outer-field zone [109].

Figure 2:
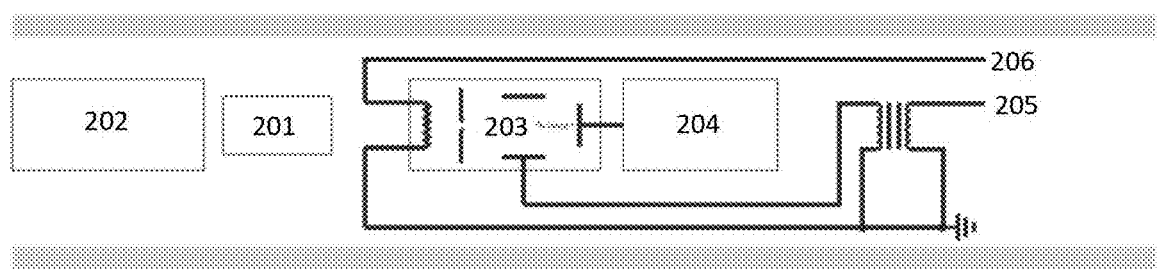
FIG. 2 illustrates a schematic layout of a typical pulsed neutron tube.

FIG. 2 illustrates a typical example of a contemporary neutron porosity logging tool, wherein a near space [201] and far space [202] neutron detector are located upon the axis within a tool housing, along with a neutron tube [203]. A 'replenisher' current [206] causes the production of deuterium gas within a vacuum chamber within the tube [203]. A radio-frequency (RF) cavity within the chamber is driven by a pulser circuit [205] (operating at 1 kHz and 10% duty cycle, for example) which acts to ionize the deuterium gas into positively charged deuterons that are accelerated toward a negative grid, powered by a high voltage generator [204], and onto a target. The target is typically a metal halide that is doped with tritium, such that the bombardment of the tritium atoms with deuterons produces helium ions and 14.1 MeV neutrons. The pulsing technique means that pulses of neutrons are produced and the near [201] and far [202] space detectors operate during the time when the generator is not pulsing to collect signals coming back from the surrounding formation without being swamped by primary neutrons arriving directly from the source. To achieve this effect, the pulser signal is typically used to gate the response of the detectors.

Figure 3:
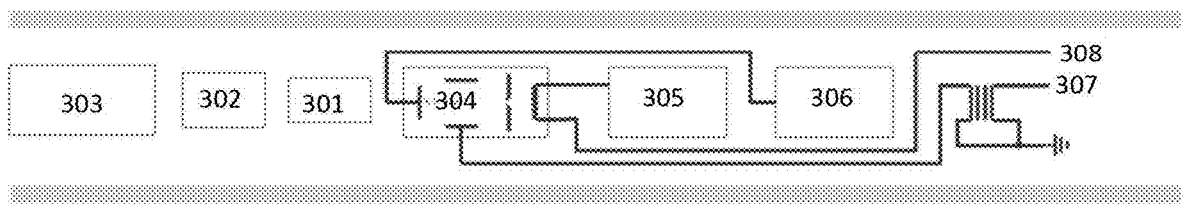
FIG. 3 illustrates one embodiment of a bipolar pulsed neutron tube, illustrating the ability to combine two high-voltage generators to produce a higher tube voltage without changing the outer diameter of the downhole tool housing.

FIG. 3 illustrates one embodiment, wherein a cathode (filament) within a source tube [304] is held at a high direct current potential (such as 85 kV, for example) by a positive high-voltage generator [305], in addition to the target [extractor] electrode being held at −85 kV, by a negative high-voltage generator [306]. The result would be a potential difference across the tube [304] cavity of 190 kV, enough to enable a DD reaction (2 MeV), if the target is doped with deuterium. A mid-space detector [302] can be added between the near [301] and far [303] space detectors, such that sensitivity to the 2 MeV neutron physics is optimized. In another embodiment, the pulser's DC level is elevated to a high positive potential, such that the potential difference between the RF cavity and the target electrode is at a sufficient potential to accelerate the deuterons to fusion energies. In another embodiment, the target is doped with both tritium and deuterium, such that the either DT or DD-DT output can be selected by simply enabling or disabling the non-target multiplier [305], by a control circuit.

Figure 4:
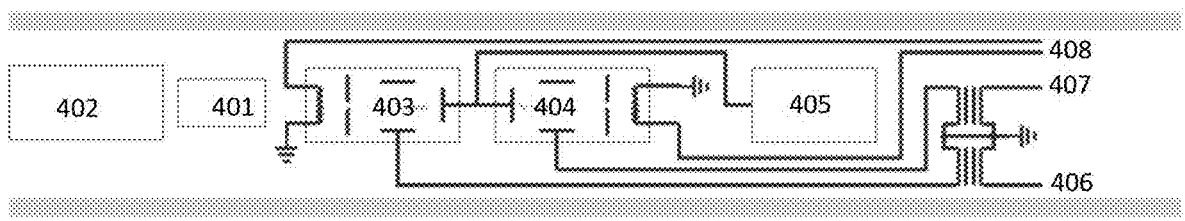
FIG. 4 illustrates one embodiment of a unipolar pulsed neutron tube, illustrating the ability to combine two tubes into a single package with a common target electrode. Further illustrating the ability to effectively double the output of a single target-plane while using a single generator.

FIG. 4 illustrates one embodiment where the neutron generation tube [403, 404] is mirrored around the target, such that a single high voltage generator [405] is required, to operate two halves of a tube with a common target electrode (even if the two physical targets are distinct and separate). By using two pulsers [406, 407] that are out of phase with each other, the effective pulse rate would double, thereby doubling output neutron flux from a pair of co-located targets. This effect ensures that the target region for the conjoined tubes is collocated. Power-wise, the beam current delivery of the high voltage generator would effectively double, but with a half-contribution interlaced from each tube-half [403,404].

Figure 5:
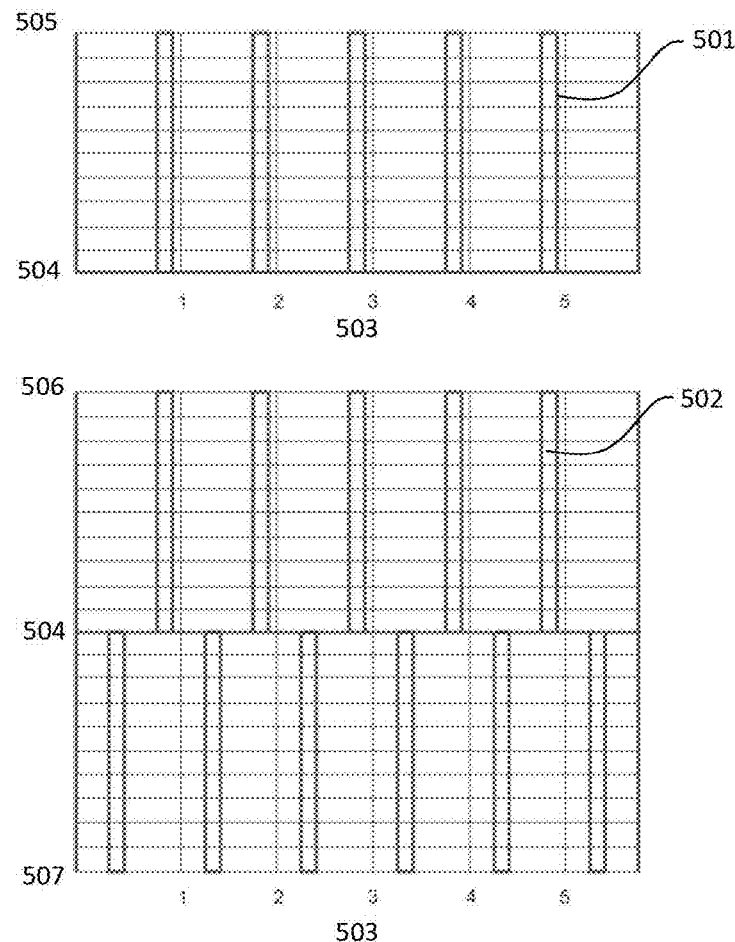
FIG. 5 illustrates two embodiments of pulsing schemes that may be used to control either a single-polar tube or a pair of tubes with a common target. Further illustrating the ability to select neutron-burst energies through the selection of pulse-schemes to a common target.
Figure 6:
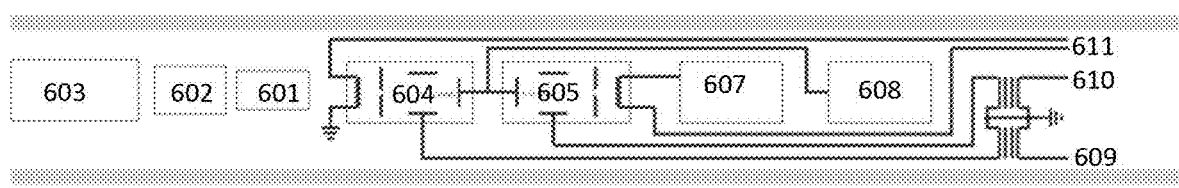
FIG. 6 illustrates one embodiment of a bipolar pulsed neutron tube, illustrating the ability to combine two tubes into a single package with a common target electrode, with each tube capable of developing differing tube voltages. Further illustrating the ability to select which tube and, therefore, which energy neutron would be emitted by the common linked targets, through use of two pulser and radio-frequency cavities.

FIG. 5 illustrates an example embodiment of the conjoined common target region scheme illustrated in FIG. 4. A single pulsing regime [501] is illustrated as a function of voltage between ground [504] and high-voltage output [505] versus time [503]. Two pulser circuits with a common ground [504] would operate at a set frequency and duty-cycle but with the each side of the pulser operating [π/2] out of phase with the other [502], such that the positive high-voltage [506] output is out of phase with the negative high-voltage [507] output. In another embodiment, the pulsers operate in phase with each other, FIG. 6 illustrates an example embodiment wherein an additional high voltage generator [607] is included on one side of the conjoined tube [604, 605], and the associated target doped with both tritium and deuterium, and an interleaved pulser scheme used as illustrated in FIG. 5, such that every pulse of neutrons out of the target alternates between 14 MeV neutrons and 2 MeV neutrons. In this manner, the response of the mid-space [602] and far-space [603] detectors is individually gated to the separate timing signals of the pulsers [609, 610] controlled by a control circuit, such that a separate profile for near-field and far-field porosity response is determined during the same logging run.

In one example embodiment, a near space, mid space and far space neutron detector are located upon the axis within a tool housing, along with a neutron generator. A radio-frequency cavity within the chamber is driven by a pulser circuit (operating at 1 kHz and 10% duty cycle, for example) which acts to ionize the deuterium gas into positively charged deuterons that are accelerated toward a negative grid (powered by a voltage multiplier) and onto a target. The target is typically a metal halide that is doped with tritium, such that the bombardment of the tritium atoms with deuterons produces helium ions and 14.1 MeV neutrons. The pulsing technique means that pulses of neutrons are produced, as it permits the near and far space detectors to operate during the time when the generator is not pulsing, to collect signals coming back from the surrounding formation without being swamped by primary neutrons directly from the source. To achieve this, the pulser signal is typically used to gate the response of the detectors.

In one embodiment the cathode circuit's DC level is held at a high potential (such as 85 kV), in addition to the target [extractor] electrode being held at −85 kV. The result is a potential difference across the RF cavity of 190 kV, enough to enable a DD reaction (2.5 Mev), if the target is doped with deuterium. A mid-space detector is located between the near and far space, such that sensitivity to the 2.5 MeV neutron physics is optimized. In another embodiment, the pulser's DC level is elevated to a high positive potential, such that the potential difference between the RF cavity and the target electrode is at a sufficient potential to accelerate the deuterons to fusion energies.

In another example embodiment, the target is doped with both tritium and deuterium, such that either the DT or DD-DT output is selected by simply enabling or disabling the non-target multiplier.

In another embodiment, the neutron generation tube is mirrored around the target, such that a single multiplier is required to operate two halves of a tube with a common target electrode (even if the two physical targets are distinct and separate). By using two pulsers disposed out of phase with each other, the effective pulse rate is doubled, thereby doubling the output neutron flux from a pair of co-located targets. This effect ensures that the target region for the conjoined tubes is collocated. Power-wise, the beam current delivery of the multiplier effectively doubles, but with a half-contribution interlaced from each tube-half. In the conjoined common target region scheme, two pulser circuits with a common ground operate at a set frequency and duty-cycle, but with the each side of the pulser operating [$\pi/2$] out of phase with each other.

In another example embodiment, the pulsers operate in phase with each other, the benefit being to double the output of the tube without increasing the thermal dissipation load on the individual target faces. A doubling of neutron output flux permits a doubling of possible logging speeds (up to 7,200 ft/hr., for example) without reducing the statistical quality (accuracy) of the measured porosity response.

In another example embodiment, an additional multiplier is included on one side of the conjoined tube, and the associated target doped with both tritium and deuterium, and an interleaved pulser scheme used, so that every pulse of neutrons out of the target alternates between 14.1 MeV neutrons and 2.5 MeV neutrons. In this way, the response of the mid-space and far-space detectors is individually gated to the separate timing signals of the pulsers, such that a separate profile for near-field and far-field porosity response could be determined during the same logging run.

Those of ordinary skill in the art will understand that in this context, D+T→n+4He ($E_n$=14.1 MeV).

Ordinarily skilled artisans will also appreciate that in this context, D+D→n+3He ($E_n$=2.5 MeV).

As the energy of produced neutrons determines the depth of investigation of the measurement, and therefore the offset of the detectors of optimum sensitivity, the lower energy neutrons produced through a D-D reaction will produce a measurement more sensitive to porosity changes within a near-field region, such as the cement immediately surrounding a borehole, whereas higher energy neutrons produced by a D-T reaction are sensitive to a near-and-outer-field zone such as the formation and outer cemented casing annuli of a well. The bias between the DD measurement and the DT measurement is used to indicate whether increased porosity (as could be expected by a fluid channel in the cement) is in the near-field zone or outer-field zone.

In another embodiment, multiple detector positions are used to further increase the dimensionality of the received data (alternating between 2 MeV and 14 MeV) such that radial resolving ability can be increased.

In another embodiment, the neutron detectors are helium-3-filled detectors.

In another embodiment, the neutron detectors are lithium-6 glass detectors.

In another embodiment, the source tube is shielded in all but one direction and is manipulated such that it rotates around the tool major axis, such that azimuthal porosity information may be determined through directional bias of the source and/or detectors using neutron moderating or shielding materials.

In another embodiment, the source tubes and detectors are shielded in all but one direction and are manipulated such that they rotate around the tool major axis, such that azimuthal porosity information may be determined through directional bias of the source and/or detectors using neutron moderating or shielding materials.

In another embodiment, technique is combined with ultrasound or x-ray density techniques. Radially resolved porosity could be highly advantageous when combined with x-ray, ultrasonic and azimuthal neutron techniques, to map-out (in 3D) the porosity associated with channels or fluid defects in cement surrounding a borehole.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:
1. A neutron porosity tool comprising:
a first vacuum tube enclosing a first ion target, a target electrode coupled to the first ion target, a first radio-frequency (RF) cavity, and a first cathode;
a plurality of neutron detectors;
a current source coupled to the first cathode;
a first pulser circuit coupled to the first RF cavity and to the plurality of neutron detectors, the first pulser circuit to drive the first RF cavity and to gate a response of the plurality of detectors; and a first high-voltage generator coupled to the target electrode, the first high-voltage generator to provide a voltage to the target electrode.

2. The tool of claim 1, further comprising a second pulser circuit, wherein the first and second pulser circuits are to provide two differing ion accelerating voltages, such that deuterium-deuterium reactions and deuterium-tritium reactions are generated within a single reactance plane while the tool is positioned within a borehole.

3. The tool of claim 1, further comprising a second pulser circuit, wherein the first and second pulser circuits are to provide substantially equivalent ion accelerating voltages, such that deuterium-deuterium reactions are generated within a single reactance plane while the tool is positioned within a borehole.

4. The tool of claim 1, further comprising a second pulser circuit, wherein the first and second pulser circuits are to provide substantially equivalent ion accelerating voltages, such that deuterium-tritium reactions are generated within a single reactance plane while the tool is positioned within a borehole.

5. The tool of claim 1, further comprising a second vacuum tube enclosing a second cathode and a second ion target co-located with the first ion target, wherein the target electrode is a common target electrode that is coupled to the first and second ion targets, and the first high-voltage generator is to provide the voltage to the common target electrode, such that deuterium-deuterium reactions and deuterium-tritium reactions are generated within a single reactance plane while the tool is positioned within a borehole.

6. The tool of claim 1, wherein the plurality of detectors comprise helium-3 gas.

7. The tool of claim 1, wherein the plurality of detectors comprise Lithium-6 glass.

8. The tool of claim 1, further comprising:
a second vacuum tube that forms a conjoined tube with the first vacuum tube, wherein the second vacuum tube encloses a second ion target, a second RF cavity, and a second cathode, and the target electrode is a common target electrode that is coupled to the first and second ion targets.

9. The tool of claim 8, further comprising:
a second pulser circuit coupled to the second RF cavity, wherein the first and second pulser circuits are coupled to a common ground potential, and the second pulser circuit is to drive the second RF cavity.

10. The tool of claim 9, wherein the plurality of neutron detectors includes a first neutron detector and a second neutron detector, the first pulser circuit is to gate a response of the first neutron detector, and the second pulser circuit is to gate a response of the second neutron detector.

11. The tool of claim 9, wherein the first pulser circuit operates in phase with the second pulser circuit.

12. The tool of claim 1, further comprising:
a second high-voltage generator, wherein the first cathode is coupled between the second high-voltage generator and the current source.

13. A method of operating a neutron porosity tool, the method comprising:
causing a vacuum tube of the tool to produce two distinct neutron reactions by:
driving a first radio-frequency (RF) cavity with a first pulser circuit of the tool, and
providing a voltage to a target electrode with a first high-voltage generator of the tool, the vacuum tube enclosing the first RF cavity and the target electrode; and
gating a response of a plurality of neutron detectors with the first pulser circuit to determine formation response offsets.

14. The method of claim 13, further comprising causing the first pulser circuit and a second pulser circuit of the tool to provide two differing ion accelerating voltages, such that deuterium-deuterium reactions and deuterium-tritium reactions are generated within a single reactance plane while the tool is positioned within a borehole.

15. The method of claim 13, wherein the tool comprises a second vacuum tube enclosing a second cathode and a second ion target co-located with the first ion target, the target electrode is a common target electrode that is coupled to the first and second ion targets, and the method further comprising providing the voltage to the common target electrode with the first high-voltage generator, such that deuterium-deuterium and deuterium-tritium reactions are generated within a single reactance plane while the tool is positioned within a borehole.

* * * * *